US012590648B2

(12) United States Patent
Kwon et al.

(10) Patent No.: US 12,590,648 B2
(45) Date of Patent: Mar. 31, 2026

(54) FLUID PRESSURE REDUCING DEVICE

(71) Applicant: YPP CORPORATION, Seoul (KR)

(72) Inventors: Kab Ju Kwon, Daejeon (KR); Min Wong Hwang, Changwon-si (KR)

(73) Assignee: YPP CORPORATION, Seoul (KR)

( * ) Notice: Subject to any disclaimer, the term of this patent is extended or adjusted under 35 U.S.C. 154(b) by 0 days.

(21) Appl. No.: 18/570,605

(22) PCT Filed: Oct. 13, 2022

(86) PCT No.: PCT/KR2022/015509
§ 371 (c)(1),
(2) Date: Dec. 14, 2023

(87) PCT Pub. No.: WO2024/071501
PCT Pub. Date: Apr. 4, 2024

(65) Prior Publication Data
US 2025/0243949 A1     Jul. 31, 2025

(30) Foreign Application Priority Data
Sep. 30, 2022     (KR) ........................ 10-2022-0125317

(51) Int. Cl.
*F16K 47/08*          (2006.01)
*F16K 1/36*           (2006.01)
(52) U.S. Cl.
CPC ................ *F16K 47/08* (2013.01); *F16K 1/36* (2013.01)

(58) Field of Classification Search
CPC .... F16K 47/08; F16K 47/04; F16L 55/07236; F16L 55/0729; F16L 55/02727; F16L 55/02718
See application file for complete search history.

(56) References Cited

U.S. PATENT DOCUMENTS

| | | | | |
|---|---|---|---|---|
| 7,690,400 B2 * | 4/2010 | Haines | .................... | F16K 47/08 138/40 |
| 9,528,632 B2 * | 12/2016 | Glaun | .................... | B33Y 80/00 |
| 10,758,849 B2 * | 9/2020 | Richardson | ............ | B01D 29/46 |

FOREIGN PATENT DOCUMENTS

| | | |
|---|---|---|
| EP | 3798485 A1 | 3/2021 |
| KR | 10-0477005 B1 | 3/2005 |
| KR | 10-1233653 B1 | 2/2013 |
| KR | 10-2013-0035043 A | 4/2013 |
| KR | 10-2013-0055061 A | 5/2013 |

* cited by examiner

*Primary Examiner* — Michael R Reid
(74) *Attorney, Agent, or Firm* — Heedong Chae; Lucem, PC

(57) ABSTRACT
The present invention relates to a device provided inside a valve (10) to control a flow of a fluid. More specifically, the present invention relates to a device that is installed inside a valve (10) to reduce a fluid speed at a side of a second port (510) through reduction in pressure and speed by suppressing a flow of a high-pressure fluid from a side of a first port (410) under a condition in which a difference in pressure between a fluid pressure at an inlet of the valve (10) and the fluid pressure at an outlet of the valve (10).
The present invention is a device for preventing damage to a plug (13) due to a fluid colliding toward the plug (13) inside a valve (10) by suppressing a flow of the fluid.

3 Claims, 10 Drawing Sheets

(disk A)                    (disk B)

(A)             (B)

(A)                    (B)

(disk A)          (disk B)

(A)

(B)

(in) Enlarged view (in)  flow view (out) Enlarged flow view (disk A)

(disk B)

FLUID PRESSURE REDUCING DEVICE

TECHNICAL FIELD

The present invention relates generally to a device installed inside a valve to control a pressure of a fluid. More specifically, the present invention relates to a device for reducing a pressure and speed to lower the fluid pressure and speed at an outlet side by suppressing a flow of a high-pressure fluid from an inlet under a condition of a large difference in fluid pressure between a fluid pressure at an inlet side and the fluid pressure at the outlet side.

BACKGROUND ART

In general, a piping facility uses a valve to block a flow of a fluid passing through a pipe or to adjust a flow rate of the fluid. In order to increase a transfer driving force and efficiency of the fluid from one end to the other end of the pipe, the piping facility has a high fluid pressure from one end of the pipe using a power device, such as a pump in case of a liquid and a compressor in case of a gas.

The fluid is transferred at a high speed using the high pressure. However, when the fluid is transferred at an excessively high speed, vibration and noise are generated, resulting in water hammering and cavitation in a curved pipe part. Therefore, the piping facility is generally designed such that a flow velocity of gas is 75 m/s or less and a flow velocity of liquid is 5 m/s or less.

Among the valves, a control valve is a valve that controls the flow rate of the fluid and adjusts the flow rate by moving a plug forward and backward. In general, a valve operated under a high-pressure condition has a fluid pressure division device (that is, referred to as a fluid pressure reducing device or a case) provided around the plug in order to easily adjust the flow rate using the plug. The position of the plug moves forward and backward to adjust the flow rate of the fluid passing through the fluid pressure reducing device, thereby adjusting the entire flow rate of the fluid passing through the valve.

The fluid pressure reducing device is provided between an inlet through which a high-pressure fluid is introduced and an outlet through which the fluid is discharged in a low-pressure state to adjust the flow rate of the valve and reduce the pressure of the fluid. The value includes a body, a fluid pressure reducing device mounted inside the body, and a plug moving forward and backward along an inner circumferential surface of the fluid pressure reducing device. The plug moves forward and backward along the inner circumferential surface of the fluid pressure reducing device, thereby serving to open and close the flow of the fluid at an outlet side of the fluid pressure reducing device. In particular, resistance is provided to a flow of the fluid between an inlet through which hundreds of bars of the high-pressure fluid flows and an outlet through which the fluid flows in a low-pressure state such as atmospheric pressure, thereby inducing pressure reduction of the fluid.

However, high kinetic energy of the fluid generated due to pressure drop in the valve causes problems such as cavitation, flashing, noise, and vibration. As a result, the fluid pressure reducing device, the seat ring, the plug, and the like, which are main components of the valve, are damaged.

In general, when the pressure of the fluid at the inlet side is low, the fluid pressure reducing device has a hole through which the fluid may directly communicate, and has a structure in which when the pressure difference is large due to the high inlet pressure and the low outlet pressure of the fluid, a direction of a flow path of the fluid pressure reducing device is changed in order to reduce the pressure and speed of the fluid.

A fluid pressure reducing device, which has a structure with a zigzag flow path or a structure in which a flow path repeats contraction, expansion, and vortex when there is a large difference in pressure between the inlet and the outlet of the valve, is disclosed as a conventional technology.

In the related art 1 of Korean Registered Patent 10-1233653 (a device for reducing the pressure and speed of a flowing fluid), disks having through-holes are stacked in a direction of a central shaft, and the stacked disks have a right-angled through-hole formed in the disks so as to form flow paths between the stacked disks, and the flow paths communicate with the right-angled through-hole of another adjacent disk.

FIG. 1(A) is a sectional view of a valve 10 in a state in which the fluid pressure reducing device of the present invention is mounted, and FIG. 1(B) is a perspective view of a basic configuration of the conventional fluid pressure reducing device. The fluid pressure reducing device 20 is installed inside the valve 10 which is a kind of a fluid treatment device. The valve 10 includes: a body having an inlet 11a and an outlet 11b; a fluid pressure reducing device 20 installed inside the body 11; a plug 13 moving forward and backward so as to make contact with an inner circumferential surface of the fluid pressure reducing device 20, and connected to a stem to adjust a flow rate of the fluid between the inlet 11a and the outlet 11b; and a seat ring 14 making close contact with the body 11 and the plug 13 to block the flow of fluid.

Meanwhile, directions of the inlet and the outlet in the valve may be changed according to characteristics of the valve and a type of fluid used. In addition, the flow rate of the fluid flowing through the valve 10 is adjusted as the plug 13 connected by the stem 12 moves forward and backward along an inner diameter of the fluid pressure reducing device 20. When the plug 13 moves upward as shown on the right side with respect to the center line of FIG. 1(A), the flow rate increases by opening the flow path, and when the plug 13 moves downward as shown on the left side with respect to the center line of FIG. 1(A), the flow rate decreases by closing the flow path.

FIG. 1(B) is a view showing an example of the conventional fluid pressure reducing device 20. The fluid pressure reducing device has a shape with a predetermined thickness by stacking a plurality of disks having central holes 25 at the center thereof, and a cover plate 26 is disposed on each of the rightmost disk and the leftmost disk. The fluid pressure reducing device including the plurality of disks 21 is integrally coupled through welding, pins, bolts, or brazing. In addition, since pattern holes are formed in each disk to have a predetermined pattern, the fluid pressure reducing device formed by the plurality of stacked disks has flow paths formed by the pattern holes which are repeatedly formed, in which the flow paths are radially formed between an outer circumferential surface and an inner circumferential surface of the central hole 25.

To describe in more detail with reference to FIG. 1(B), the fluid pressure reducing device 20 includes a plurality of first pattern holes 23, 24 radially formed in the first disk 21, and a plurality of second pattern holes radially formed in the second disk. The first disk and the second disk are stacked such that the first pattern hole and the second pattern hole radially form a flow path 22, and different disks are stacked on each outer side of the first disk and the second disk, in which a surface in which the pattern hole is not formed is stacked by a predetermined angle. However, since this structure has a shape in which fluid resistance of the flow path is generated while the flow path is changed to a right-angled direction, the fluid resistance of the flow path for pressure reduction is small, so that there is a disadvantage in that a device has to be made large in order to make a reduced pressure and flow velocity.

The related art 2 of Korean Registered Patent No. 10-1513328 (direct metal laser sintered flow control element) relates to a flow control element including an element body, which includes a bore formed therethrough and defines an inner circumferential surface, in which a flow path is provided repeatedly so as to be twisted in a direction perpendicular to a plane, thereby forming fluid resistance of the flow path. Thus, as in the related art 1, since the fluid resistance of the flow path is small, a device needs to be largely manufactured in order to obtain a desired reduced pressure and flow velocity, and manufacturing time and manufacturing costs are largely required due to sintering of powdered material.

In the related art 3 of Korean Registered Patent No. 10-2139969, a method is used in which a fluid introduced into a vortex hole of a disk repeats a process in which the fluid is introduced into the vortex hole of an adjacent disk through a slit, thereby generating a vortex of the fluid introduced into the vortex hole and decreasing a flow velocity. This device repeats the diffusion of the fluid from the slit forming the flow path to a circular hole, and in order to obtain a desired level of flow resistance due to small fluid resistance to the fluid, several slits and vortex holes need to be formed, and thus the device needs to be manufactured largely.

FIG. 2(A) is a photograph showing a state of damage to a plug due to collision with the fluid in a fluid pressure reducing device in which the plug is combined. As shown in FIG. 2(B), the plug damage is generated as the plug moves forward and backward while making close contact with the inner circumferential surface of the fluid pressure reducing device, thereby opening and closing the outlet of the fluid pressure reducing device, and the fluid introduced into the inlet of the valve body is discharged toward the plug of the inner circumferential surface of the fluid pressure reducing device along the inlet, the pressure reduction flow path, and the outlet of the fluid pressure reducing device. When the outlet of the fluid pressure reducing device is located below the lower end of the plug, the fluid passes through the seat ring through the outlet of the fluid pressure reducing device and flows to the outlet. When the outlet of the fluid pressure reducing device faces the outer circumferential surface of the plug, the fluid passing through the fluid pressure reducing device collides with the circumferential surface of the plug at the outlet of the fluid pressure reducing device and flows in a lower end direction of the circumferential surface of the plug through a gap with the plug. The flow velocity at which the fluid passes through the gap varies depending on the position of the plug with respect to the fluid pressure reducing device. This is due to the length and resistance of the flow path through which the fluid may flow. In the outlet of the fluid pressure reducing device, the flow velocity becomes higher at the lower side than at the upper side.

In this case, since a space between the fluid pressure reducing device and an inclined surface of the lower end of the plug is gradually expanded downward, a flow velocity of the fluid at an expanded space is much higher than a flow velocity of the fluid at a narrow space. This is because the pressure in the space expansion portion decreases and the flow velocity increases. As it goes downward along the inclined surface of the lower end of the plug, the speed of the fluid is greatly increased and the magnitude of the impact is greater at the lower portion of the inclined surface of the lower end of the plug. Accordingly, the erosion part by the fluid is largely formed toward the lower portion of the inclined surface of the plug. Therefore, the erosion of the inclined surface of the plug may be prevented only when the speed of the fluid discharged from the fluid pressure reducing device is lowered.

As described above, the conventional fluid pressure reducing device has a disadvantage in that the fluid resistance of the flow path is small and the device needs to be largely manufactured. In order to improve the limitations of the related art, the present inventors conceives a fluid pressure reducing device having an increased pressure reducing effect by using a unit module in which diffusion, rapid expansion, collision, rapid reduction, and rapid change of direction of a fluid occur simultaneously.

DISCLOSURE

Technical Problem

An object of the present invention is to provide a fluid pressure reducing device including a unit of a flow path capable of significantly increasing fluid resistance of the flow path even in a small area.

Specifically, another object of the present invention is to provide a fluid pressure reducing device which effectively increases resistance of a flow path within a predetermined volume such that a flow velocity of a gap between the fluid pressure reducing device and a plug is not excessively increased due to a high differential pressure that is applied between an inlet side and an outlet side of the fluid pressure reducing device.

Technical Solution

To solve the above technical problems, a fluid pressure reducing device of the present invention is a fluid pressure reducing device that is mounted in a fluid treatment device including an inlet pipe (11a) through which a high-pressure fluid is introduced and an outlet pipe (11b) through which a low-pressure fluid is discharged, to induce fluid pressure reduction, the fluid pressure reducing device comprising:

an annular disk A (100) configured to have an outer diameter and an inner diameter; and an annular disk B (200) configured to have an outer diameter and an inner diameter, which are the same as the outer diameter and the inner diameter of the disk A, wherein the disk A (100) and the disk B (200) are coupled to each other as a pair of disks, wherein a plurality of diffuser cells are formed from an outer circumferential surface (400) to an inner circumferential surface (500) of the disk A (100) so that a diffuser a (110) is radially formed in the disk A (100) in a row, a plurality of diffuser cells are formed from an outer circumferential surface (400) to an inner circumferential surface (500) of the disk B (200) so that a diffuser b (210) is radially formed in the disk B (200) in a row, in which the diffusers a (110) and the diffusers b (210) are radially spaced apart from each other at predetermined intervals, and wherein the disk A (100) and the disk B (200) are concentrically coupled to each other, thereby allowing the diffuser a (110) and the diffuser b (210) to be vertically connected to each other in order to form a pressure reduction flow path.

Advantageous Effects

According to the fluid pressure reducing device of the present invention, by simultaneously and repeatedly performing the diffusion flow of the fluid through the diffusion surface of the head portion in the pressure reduction flow path formed by each diffuser cell, the rapid expansion flow of the fluid through the body portion, the recirculation flow at the side part, the collision flow with the bottom surface, the rapid reduction to the direction conversion portion, and the rapid direction change to the upper layer or the lower layer, it is possible to significantly enhance an effect of reducing the pressure of the fluid.

The fluid pressure reducing device of the present invention includes a fluid diffusing structure from the first port to the second port so as to significantly reduce the pressure and speed of the fluid, and can reduce the impact when the fluid collides with the circumferential surface of the plug, thereby preventing erosion of the circumferential surface of the plug and precisely controlling opening/closing of the second port having the plug formed on the inner circumferential surface thereof.

Figure 1:
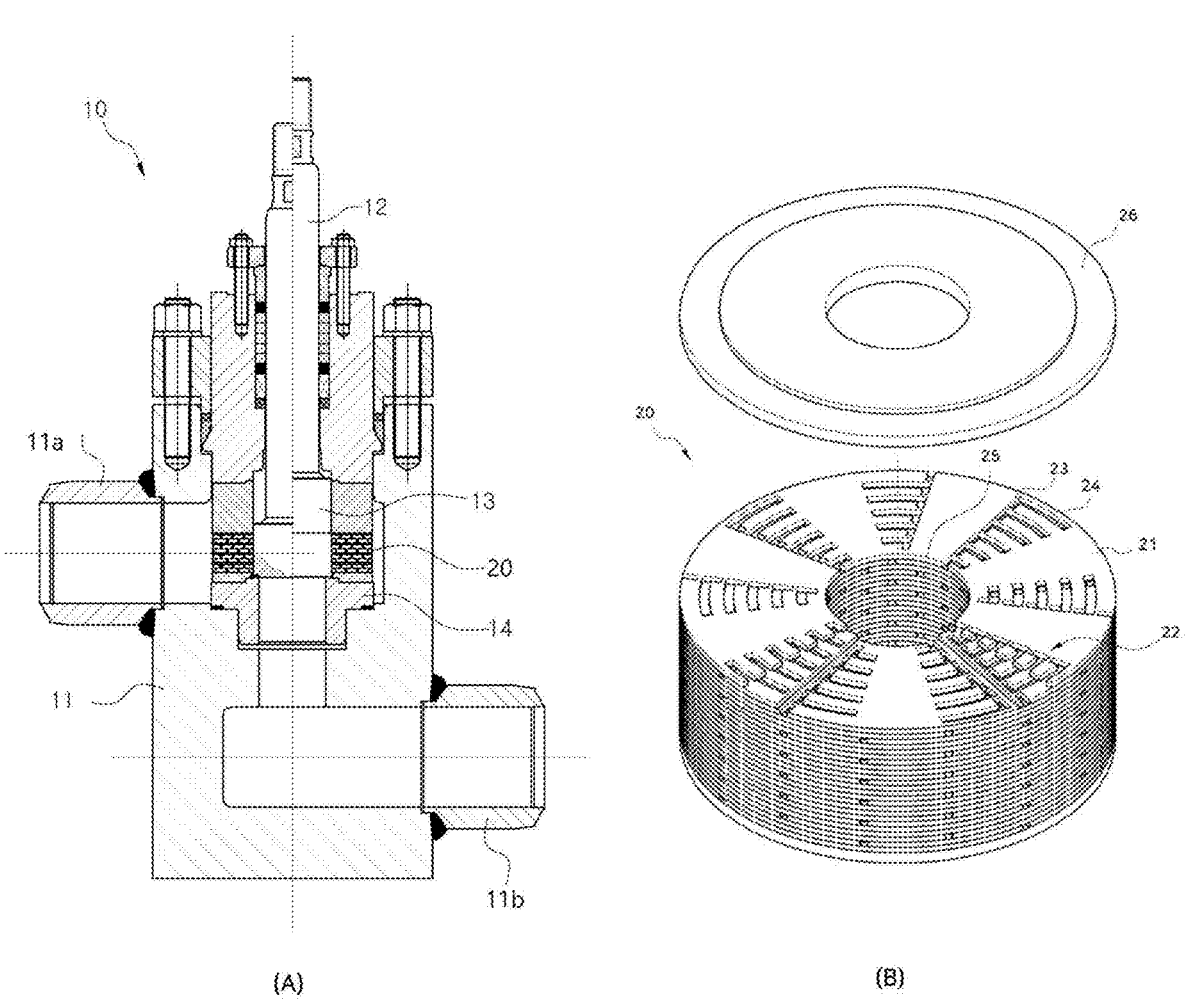
FIG. 1 is a view showing an example of a valve mounted with a conventional fluid pressure reducing device and an example of the fluid pressure reducing device.
Figure 2:
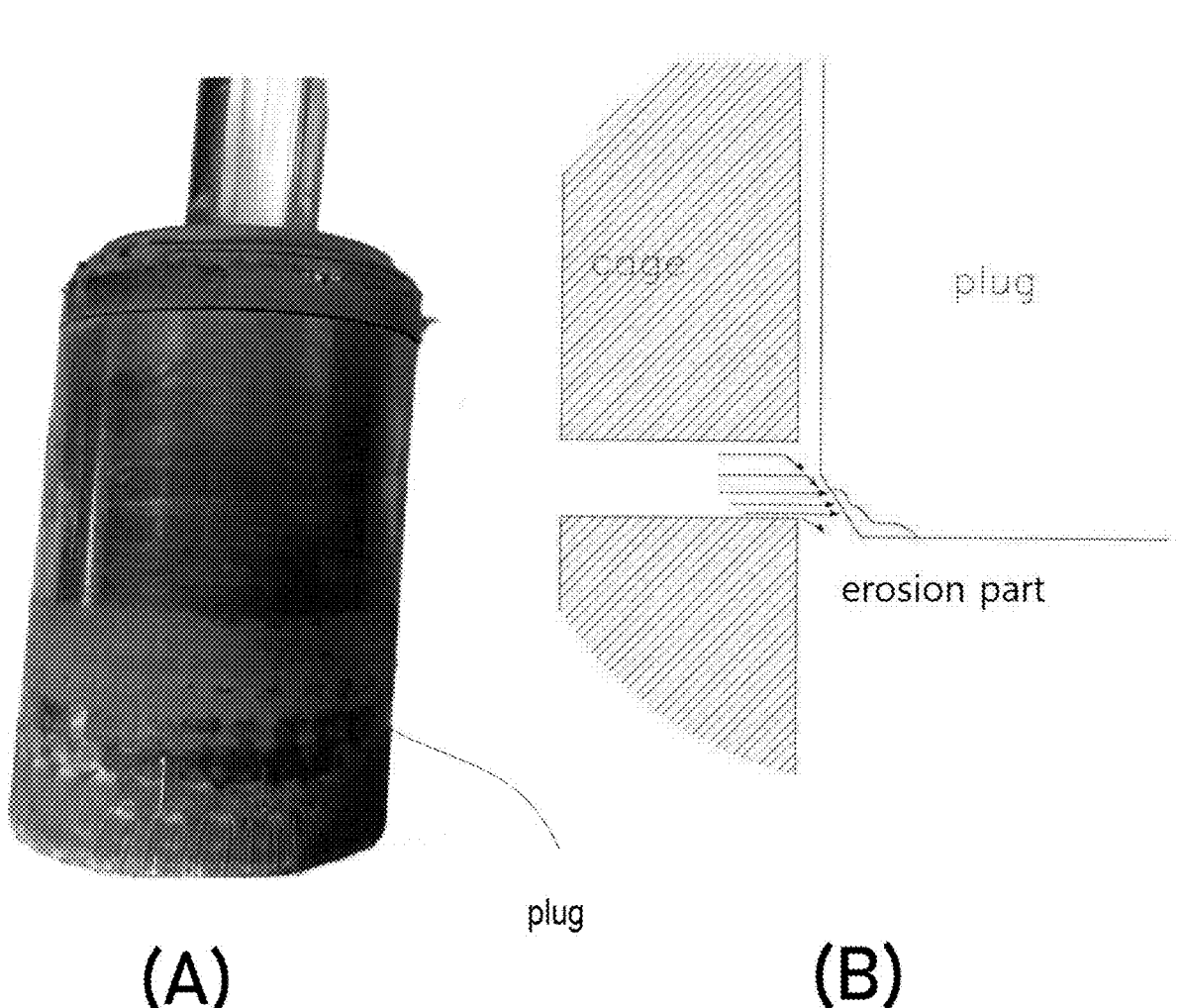
FIG. 2 is a photograph of general damage to a plug in the fluid pressure reducing device and a conceptual view of a fluid flow near the plug.

100: disk A, 110: diffuser a
200: disk B, 210: diffuser b
300: diffuser cell,
310: upper open cell, 320: closed cell, 330: lower open cell
400: outer circumferential surface, 410: first port
500: inner circumferential surface, 510: second port

MODE FOR INVENTION

Hereinafter, a pressure reducing device for a flowing fluid according to the present invention will be described with reference to the accompanying drawings. In the following embodiments, the fluid pressure reducing device embedded in the valve 10 as a fluid treatment device is described by way of example, but it should be understood that the present invention is not limited to a valve 10 and also includes a case of another device with a condition in which a high pressure is applied to a side of an inlet pipe 11a and a side of an outlet pipe 11b.

The disk described in the present invention is an annular disk having an outer diameter and an inner diameter, in which a plurality of diffuser cells are formed on the disk in a direction from the outer diameter to the inner diameter to form diffusers in a row. Hereinafter, the outer diameter is referred to as an outer circumferential surface 400, and the inner diameter is referred to as an inner circumferential surface 500. In addition, the direction toward the outer circumferential surface 400 is referred to as an upper portion, that is, an upper direction, and the direction toward the inner circumferential surface 500 is referred to as a lower portion, that is, a lower direction.

Figure 3:
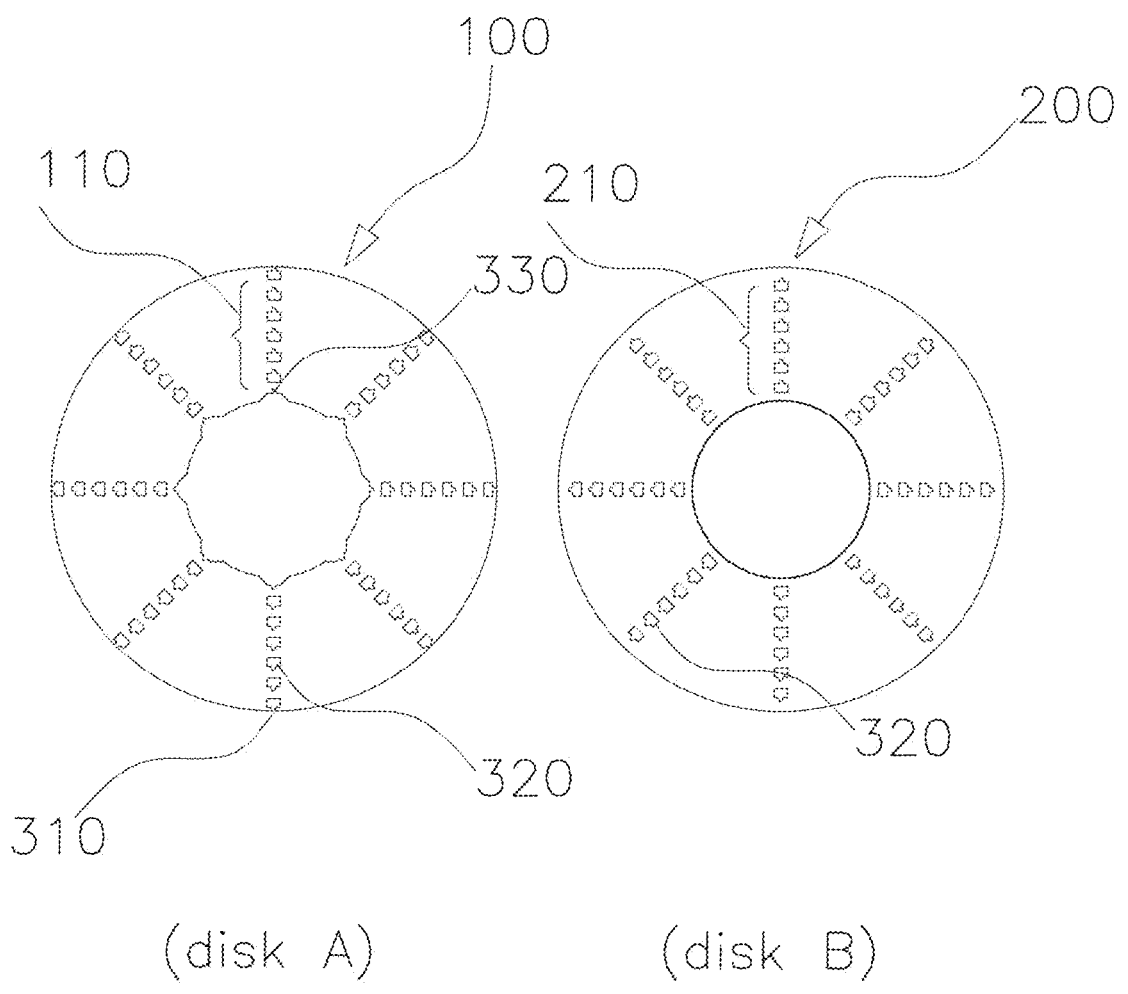
FIG. 3 is a view showing a diffuser structure formed on a disk A and a disk B according to the present invention.
Figure 4:
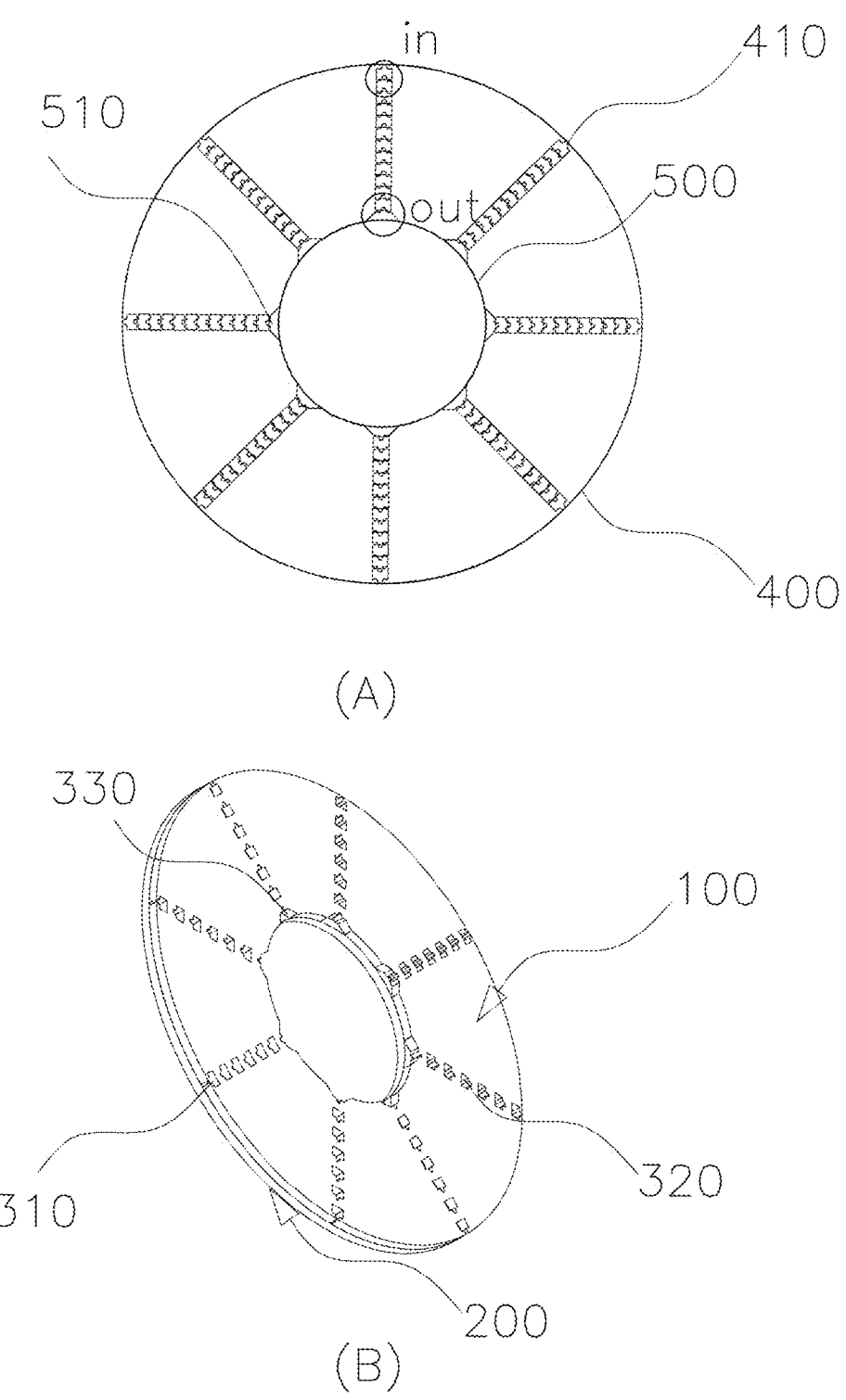
FIG. 4 is a view showing a combination of the disk A and the disk B according to the present invention.
Figure 5:
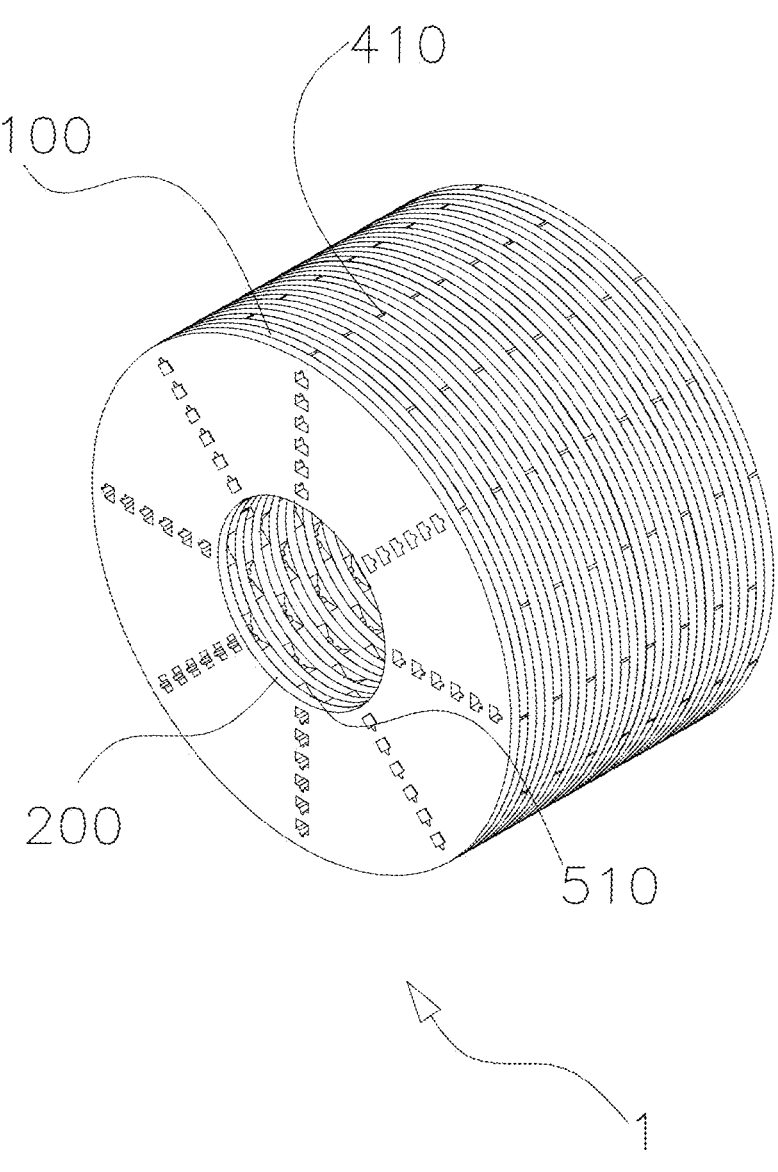
FIG. 5 is an exemplary view of the fluid pressure reducing device according to the present invention.

As shown in FIGS. 3 to 5, the fluid pressure reducing device of the present invention includes:

a fluid pressure reducing device that is mounted in a fluid treatment device including an inlet pipe 11a through which a high-pressure fluid is introduced and an outlet pipe 11b through which a low-pressure fluid is discharged, to induce fluid pressure reduction, the fluid pressure reducing device comprising:

an annular disk A 100 configured to have an outer diameter and an inner diameter; and an annular disk B 200 configured to have an outer diameter and an inner diameter, which are the same as the outer diameter and the inner diameter of the disk A, wherein the disk A 100 and the disk B 200 are coupled to each other as a pair of disks, wherein a plurality of diffuser cells are formed from the outer circumferential surface 400 to the inner circumferential surface 500 of the disk A 100 so that a diffuser a 110 is radially formed in the disk A 100 in a row, a plurality of diffuser cells are formed from the outer circumferential surface 400 to the inner circumferential surface 500 of the disk B 200 so that a diffuser b 210 is radially formed in the disk B 200 in a row, in which the diffusers a 110 and the diffusers b 210 are radially spaced apart from each other at predetermined intervals, and wherein the disk A 100 and the disk B 200 are concentrically coupled to each other, thereby allowing the diffuser a 110 and the diffuser b 210 to be vertically connected to each other in order to form a pressure reduction flow path.

Both the disk A 100 and the disk B 200 have a structure in which diffuser cells are radially formed in the form of through-holes in a disk plate.

The diffuser cell refers to the diffuser a 110 and the diffuser b 210 which are radially formed in a row, in which a plurality of diffuser cells are provided on the disk A 100 and the disk B 200 while being spaced apart from each other, and when the disk A 100 concentrically overlaps the disk B 200, the diffuser cell of the disk A 100 and the diffuser cell of the disk B 200 may form a flow path in which the fluid may flow while changing flowing directions up and down.

That is, in the present invention, the diffuser a 110 of the disk A 100 includes:

an upper open cell 310 provided adjacent to the outer circumferential surface 400 of the disk A 100 to form a first port 410 of the fluid;

a lower open cell 330 provided adjacent to the inner circumferential surface 500 of the disk A 100 to form a second port 510 of the fluid; and at least one closed cell 320 provided between the upper open cell 310 and the lower open cell 330, and wherein the upper open cell 310, the closed cell 320, and the lower open cell 330 are radially arranged in a row at predetermined intervals, so that diffuser a 110 forms a circular pattern while being spaced apart from each other in a circumferential direction of the disk A 100 at predetermined angles, wherein the diffuser b 210 of the disk B (200) has a plurality of closed cells 320 radially formed between the outer circumferential surface 400 and the inner circumferential surface 500 of the disk B 200 in a row at predetermined intervals, so that a plurality of diffusers b 210 of the disk B 200 are formed in a circumferential direction of the disk B 200 while being spaced apart from each other at predetermined angles, and wherein the disk A 100 and the disk B 200 are concentrically coupled to each other such that the diffuser cell of the disk A vertically and partially overlaps the diffuser cell of the disk B 200, in order to form a pressure a from the outer reduction flow path in direction circumferential surface 400 to the inner circumferential surface 500.

The fluid introduced into the first port 410 of the outer circumference of the disk through the disk A 100 undergoes diffusion and contraction while vertically and repeatedly passing through the diffuser cell of the disk A and the diffuser cell of the disk B 200. Accordingly, the pressure of the fluid decreases, and the fluid is finally discharged to a space of the inner circumferential surface 500 of the fluid pressure reducing device through the second port 510 of the disk A 100. In this case, a diffusion angle 301d a, which is formed by an upper end portion of the diffuser cell through which the fluid flows, is related to a pressure loss using the flow diffusion and separation, and it is preferable to form the diffusion angle 301d α at about 45 to 60°.

Figure 6:
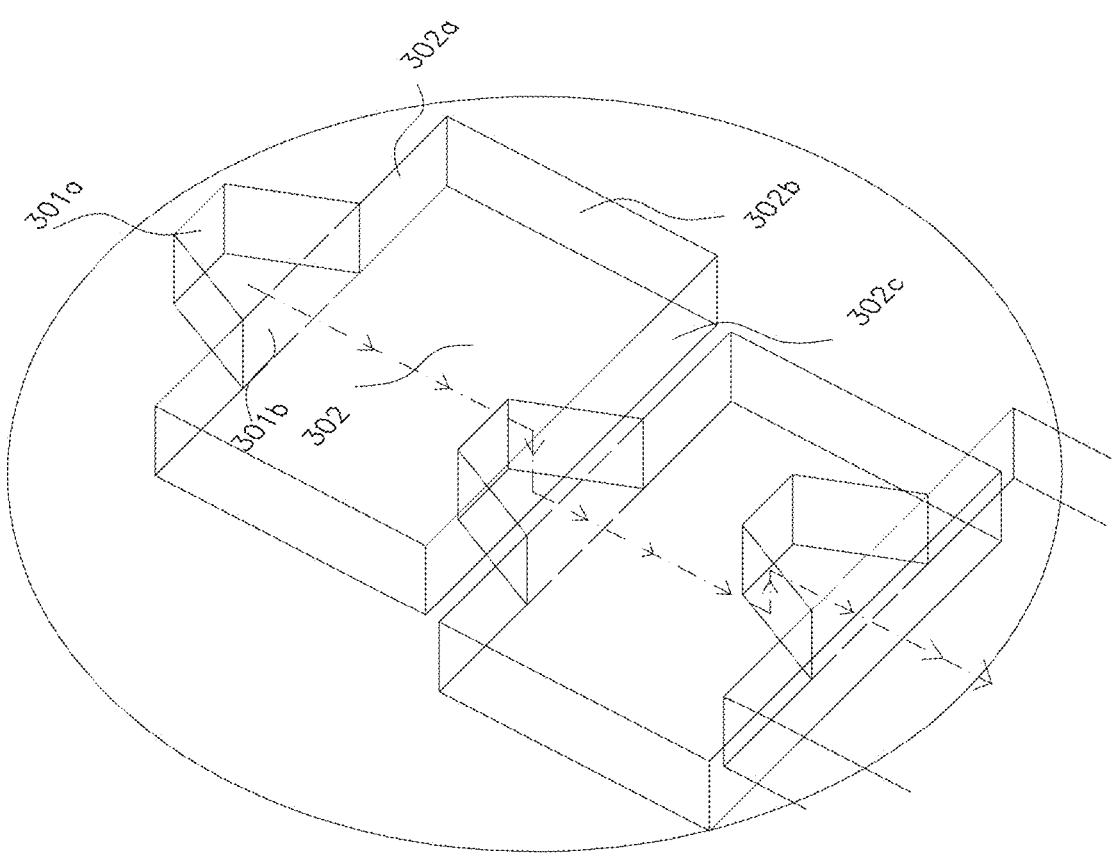
FIG. 6 is a view for explaining a flow path by a diffuser cell of the disk A and a diffuser cell of the disk B.
Figure 7:
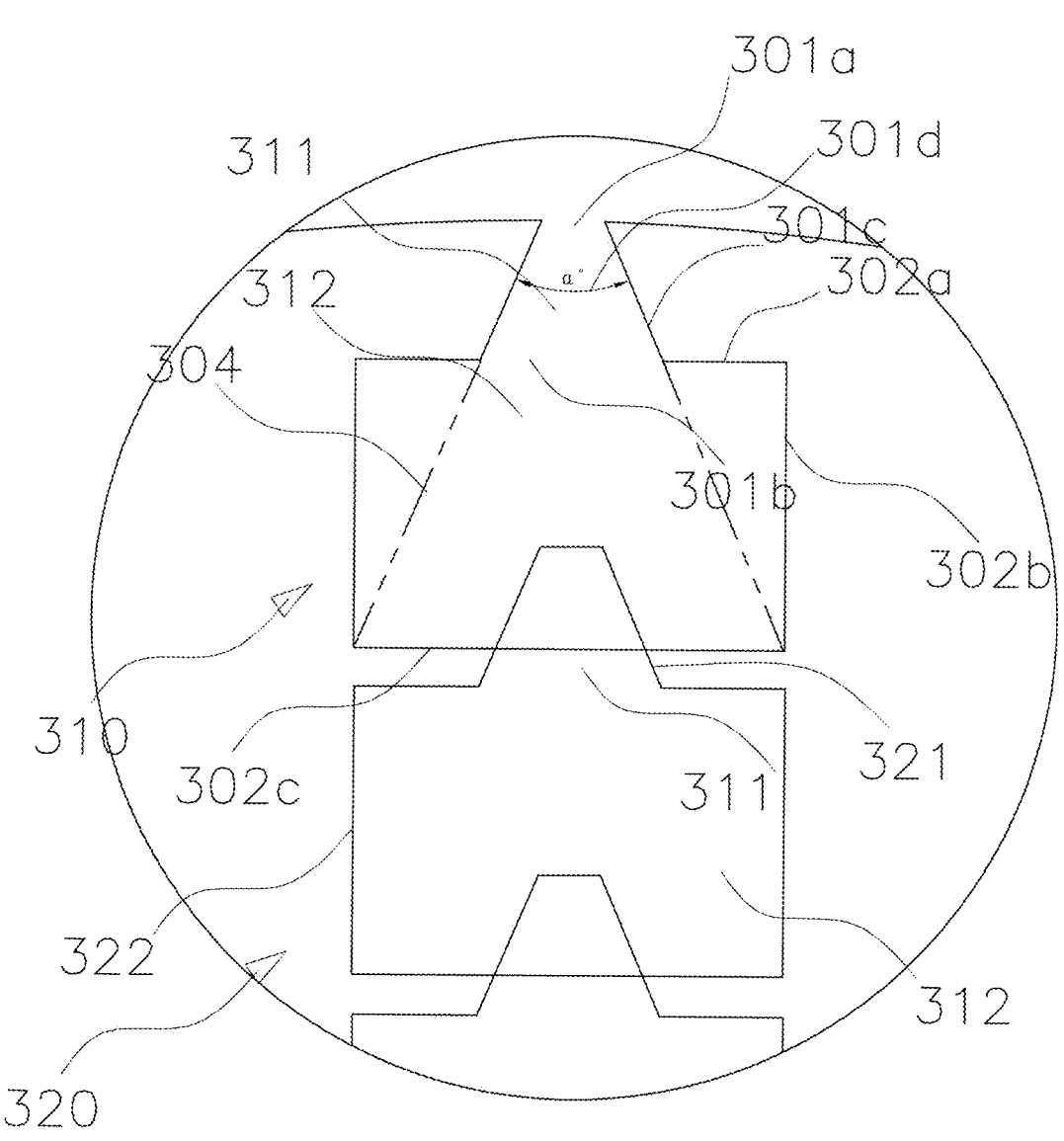
FIG. 7 is an enlarged view showing a coupling of the diffuser cell according to the present invention.

FIGS. 6 to 9 are views showing visualization of the shape and flow of the flow path that is formed by concentric coupling of the disk A 100 and the disk B 200. As shown in FIG. 6, if the disk A 100 is the first layer, the disk B 200 serves as a flow path of the second layer, and the diffuser cell of the disk A 100 overlaps the diffuser cell of the disk B 200 to vertically form a flow path. Since the disk A 100 alternately overlaps the disk B 200, a first set of disks overlaps at the same angle, but a second set of another pair of adjacent disks overlaps at different angles. Accordingly, since the first set of disks overlaps at an angle at which both side surfaces 302b are spaced apart from each other by the second set of adjacent disks and a third set of disks, upper and lower portions of the flow path formed by the diffusers may be blocked.

In detail, the diffuser cell includes a head portion 301 having a trapezoidal shape of a narrow top and a wide bottom to have a diffusion surface 301c, and a rectangular body portion 302 coupled adjacent to a lower end of the head portion 301, and is shaped like the upper body of the human including the head.

The upper open cell 310 of the disk A 100 includes an upper end open head 311 cut with respect to the outer circumferential surface 400, and an open body 312 enlarged and continuously formed with the upper end open head 311, in which the first port 410 is formed to introduce the fluid through a cut portion of the upper end open head 311, the lower open cell 330 of the disk A 100 includes an open head cut with respect to the inner circumferential surface 500, and a lower end open body 332 enlarged and continuously formed with the open head, in which the second port 510 is formed to discharge the fluid through the open head and the lower end open body 332, and the closed head 321 and the closed body 322 of the closed cell 320 provided between the upper open cell 310 and the lower open cell 330 are integrally coupled to each other, thereby forming a flow path.

With such a structure, according to the present invention, the fluid is introduced into the upper open cell 310 through the first port formed adjacent to the outer circumferential surface 400 of the disk A 100 while being cut, and the fluid introduced into the upper open cell 310 is introduced into the closed cell 320 of the disk B 200, and is introduced into the closed cell 320 of the disk A 100 again. With the structure repeated as described above, the fluid introduced through the first port 410 of the outer circumferential surface 400 flows while repeatedly moving up and down between the diffuser cell of the disk A 100 and the diffuser cell of the disk B 200.

The diffuser cells may be easily and rapidly manufactured on the disks by using a laser processing machine, a water jet processing machine, or the like, which are widely used in general. The disks manufactured in the same manner as described above may be stacked and coupled to each other by a method such as bolts, welding, or brazing to manufacture a fluid pressure reducing device.

The fluid introduced into a body of the valve 10 through the inlet pipe 11a is introduced through the first port 410 of the diffuser cell that is formed to be connected to the outer circumferential surface 400 of the disk A 100, repeatedly passes through the diffuser cell of the disk A 100 and the diffuser cell of the disk B 200, and then is discharged through the second port 510. Thereafter, the fluid is discharged to the outlet pipe 11b of the body of the valve 10 via a seat ring through a gap between the inner circumferential surface 500 of the fluid pressure reduction device and the plug 13.

Figure 8:
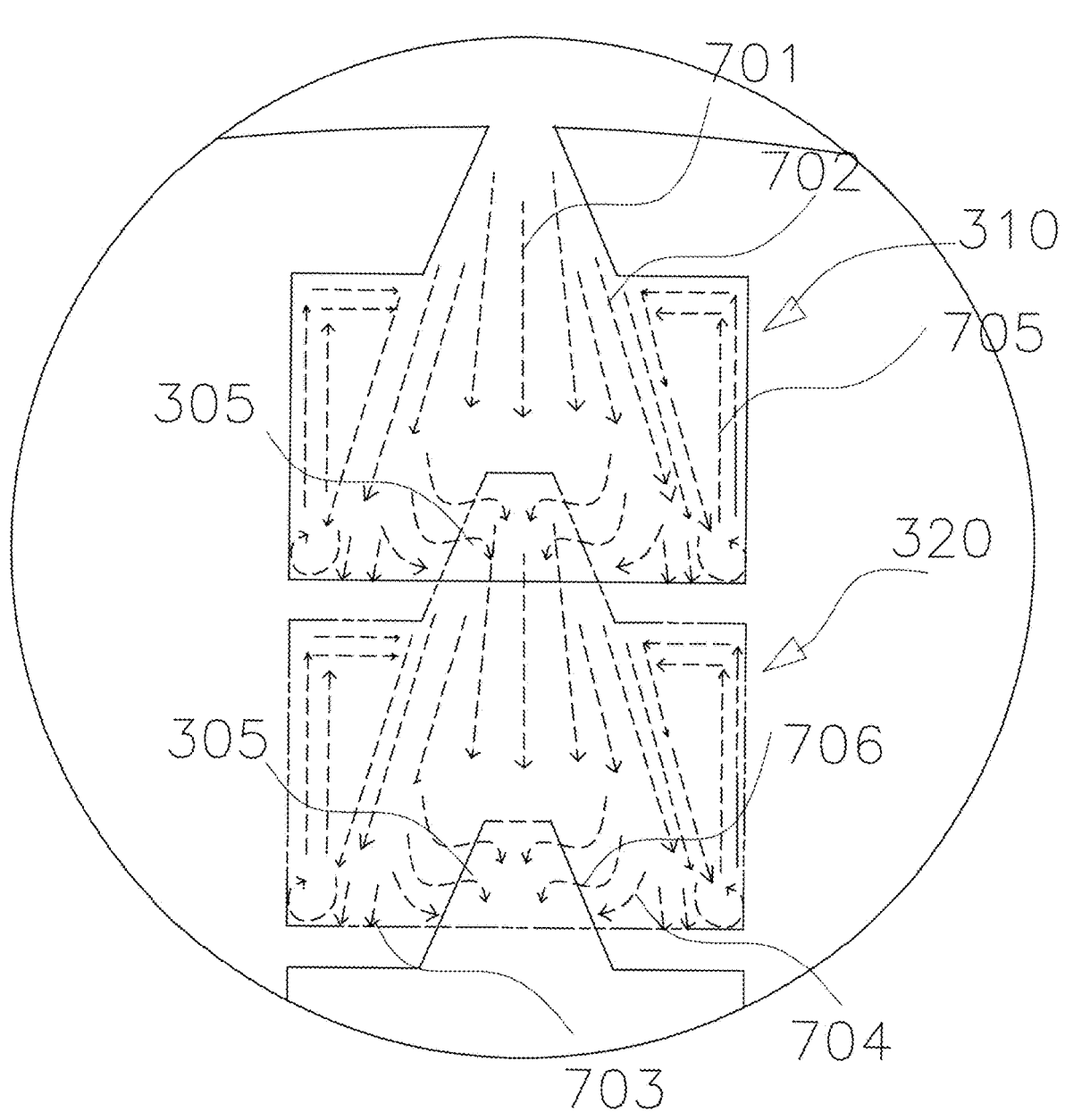
FIG. 8 is a view for explaining a flow in the diffuser cell according to the present invention.

Particularly, FIG. 8 shows a flow of a high-pressure fluid flowing in the pressure reduction flow path that is formed by the diffusers in a state where the disk A 100 is coupled to disk B 200 while overlapping each other.

The fluid pressure reducing device of the present invention forms a main flow 701 in which the fluid introduced through the head portion 301 strongly flows downward from the center while passing through the head portion 301, a expansion flow 702 in which the fluid flows along the diffusion surfaces 301c on both sides and a virtual diffusion surface 304 of the body portion extending to the diffusion surface, a recirculation flow 705 generated between a shoulder surface 302a and a side surface 302b of the body portion 302, a collision flow 703 caused by the main flow 701 at a bottom surface 302c, a rotation flow 704 in which rotation to a direction changing portion is performed after the collision flow is generated, and a direction change flow 706 in which the fluid flows while passing through the head portion 301 of the diffuser cell overlapping the body portion 302, that is, the direction changing portion 305, and changing a direction into a diffuser cell on an upper layer or a lower layer.

Particularly, since the fluid introduced through an inlet of the diffuser cell rapidly diffuses through the diffusion surface 301c, flow separation occurs, and the fluid is ejected to form a main flow path, and the recirculation flow 705 is generated outside a diffusion angle 301d of a diffusion portion, and thus an area of the main flow path decreases, and a flow velocity of the fluid flowing through the main flow path increases. As the diffusion angle 301d increases, a maximum speed of the recirculation flow 705 further increases. Increasing the speed of a region of the recirculation flow 705 further increases an energy loss in the flow path, resulting in greater pressure loss.

The fluid that diffuses and flows through the diffusion surface 301*c* of the head portion 301 of the diffuser cell strongly collides at the bottom surface 302*c* of the body portion 302, and rapidly changes the direction from the direction changing portion 305 to diffuser cell of another stacked disk toward the upper layer or the lower layer. The rotation flow in which the fluid strongly and symmetrically rotates in both directions before entering the diffuser cell of the upper layer or the lower layer is generated, thereby causing strong convection and flow bias due to Reynolds stress, resulting in an increase in energy and pressure loss. The flow path formed by the diffuser a 110 and the diffuser b 210 has such flow characteristics, thereby forming an effective fluid pressure reducing device having large energy and pressure low loss per unit volume.

The energy loss and pressure reduction capacity by the diffuser cell may be expressed as $\zeta d = f(\alpha, n, Re)$. In the above expression, a is an angle of the diffusion angle 301*d* of the diffuser cell, n is a ratio of a diffusion cross-sectional area of the diffuser, which is a ratio between an area of an inlet cross section 301*a* of the head portion 301 of the diffuser and an area of an outlet cross section 301*b* of the head portion 301, and Re is a Reynolds number. The energy loss and pressure reduction capacity increase as a, n, and Re increase, and the fluid pressure reducing device may be compactly manufactured by combining these three variables. As the angle $\alpha$ of the diffusion angle 301*d* of the diffuser cell increases, the pressure reduction capacity of the fluid increases, but when the angle $\alpha$ reaches 65°, an increase rate thereof is significantly lowered. Therefore, the angle of the diffuser is preferably about 45° to 60°. As the ratio n of the diffusion cross-sectional area of the diffuser increases, the pressure reduction capacity of the fluid increases. In addition, as the Reynolds number Re increases, the pressure reduction capacity of the fluid increases, but when the Reynolds number Re is $4 \times 10^5$ or more, the pressure reduction capacity does not increase any more. Therefore, when the angle $\alpha$ of the diffusion angle 301*d* of the diffuser, the ratio n of the diffusion cross-sectional area, and the Reynolds number (Re) are appropriately adjusted, the pressure reduction capacity increases in a given volume, thereby designing and manufacturing a compact pressure reducing device. The fluid introduced into the fluid pressure reducing device sequentially passes through the diffuser cell several times, and the pressure of the fluid decreases and the flow rate is a preset speed.

Figure 9:
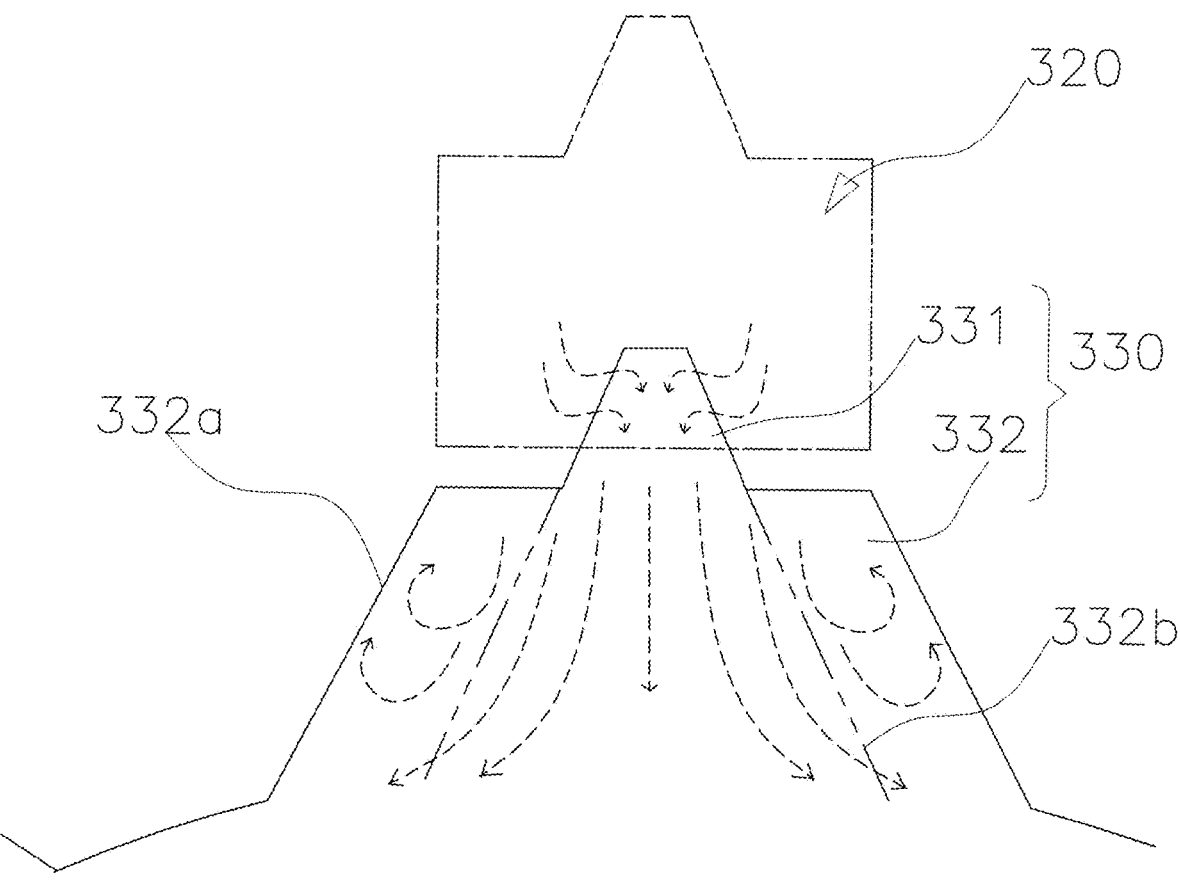
FIG. 9 is a view for explaining a flow in a second port according to the present invention.

FIG. 9 shows a structure of the second port 510 of the diffuser cell provided in the fluid pressure reducing device, and an outflow in the second port 510. The second port 510 has a diffusion passage, which is a part of the diffuser cell as indicated by a virtual line 332*b*, and forms the final second port 510 in the fluid pressure reducing device. A passage of the second port 510 is widened in a direction in which the fluid is diffused for diffusion. The flow velocity is obtained by dividing a cross-sectional area of the flow path by a flow rate, and is expressed as v=q/A. In the above expression, v is a flow velocity, A is a cross-sectional area of the flow path, and q is a flow rate. The kinetic energy at the second port 510 is $KE=1/2 \times (\rho v^2/M)$. In the expression, KE is kinetic energy, $\rho$ is a density of the fluid, v is a flow velocity, and M is a constant. Therefore, in order to lower the flow velocity and kinetic energy at the same flow rate, the cross-sectional area of the flow path may be increased. As shown in FIG. 9, the second port 510 is implemented by the diffuser cell including the lower end open head 331 and the lower end open body 332, and in order to increase the cross-sectional area of the diffuser cell, the diffusion angle 301*d* is given to the side surface 302*d* of the lower end open body 332 toward the outlet to expand the lower end open body 332 to both sides, thereby forming a lower end diffusion surface 332*a*. As a result, the flow velocity and the kinetic energy of the second port 510 may be significantly reduced to significantly reduce a collision force acting on the circumferential surface of the plug 13 that is located on the inner circumferential surface 500 of the fluid pressure reducing device, thereby preventing fatigue damage and erosion of the circumferential surface of the plug 13. Expanding the flow path by the lower end diffusion surface 332*a* may significantly reduce the flow velocity and the kinetic energy at the second port 510.

In the fluid pressure reducing device of the present invention, the main flow 701 in which the fluid is diffused through the diffusion surface 301*c* of the head portion in the pressure reduction flow path formed by each diffuser cell, the expansion flow 702 through the body portion, the collision flow 703 with the bottom surface, the recirculation flow 705 at side parts, and the direction rapid changing rotational flow 704 to the upper layer or the lower layer while being rapidly reduced toward the direction changing portion are simultaneously and repeatedly performed, thereby significantly enhancing a fluid pressure reduction effect. Specifically, when the flow of the fluid is diffused, the fluid is ejected due to flow separation, and the recirculation flow 705 is generated at a side surface. This reduces the area of the main flow path and increases the speed of the main flow. As the diffusion angle increases, the maximum speed the of recirculation flow 705 further increases. Increasing the speed of a region of the recirculation flow 705 further increases an energy loss in the flow path, resulting in greater pressure loss. When the flow of the fluid collides with a wall surface and rapidly changes the direction, a strong and symmetrical secondary flow is generated, and the secondary flow causes strong convection and flow bias due to the Reynolds stress, resulting in a complex phenomenon and a shear current. In addition, as the main flow 701 collides with the wall surface, a rapid direction change generates a strong rotational flow 704, which increases energy and pressure loss due to an increase in the Reynolds stress. With such flow characteristics, a more effective structure of the fluid pressure reducing and diffusing device may be manufactured.

The fluid pressure reducing device of the present invention includes a fluid diffusing structure at the second port so as to significantly reduce the pressure and speed of the fluid, and can reduce the impact when the fluid collides with the circumferential surface of the plug, thereby preventing erosion of the circumferential surface of the plug and precisely controlling opening/closing of the second port having the plug formed on the inner circumferential surface thereof.

Figure 10:
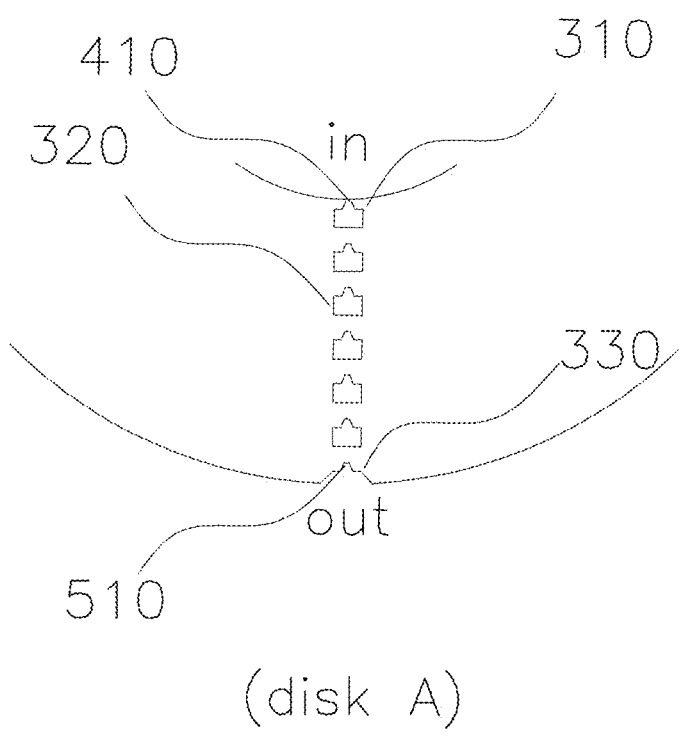
FIG. 10 is a view showing another embodiment of diffuser structures formed on the disk A and the disk B according to the present invention.
Figure 10:
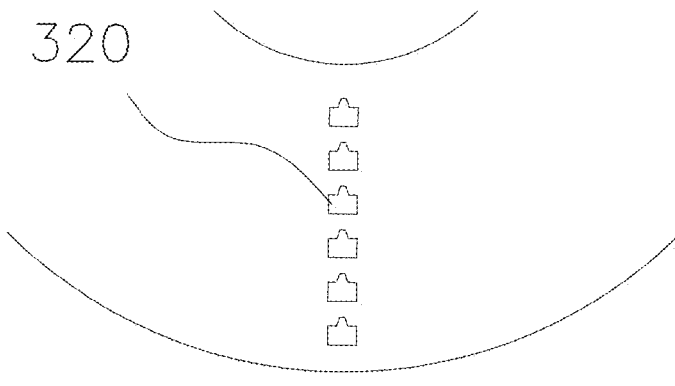

FIG. 10 is a view showing another embodiment, in which a flow path is formed such that the fluid may pass through the inner circumferential surface in an outer circumferential direction.

That is, the diffuser a 110 of the disk A 100 including the plurality of diffuser cells includes:

an upper open cell 310 provided adjacent to the inner circumferential surface 500 of the disk A 100 to form a first port 510 of the fluid;

a lower open cell 330 provided adjacent to the outer circumferential surface 400 of the disk A 100 to form a second port 410 of the fluid; and at least one closed cell 320 provided between the upper open cell 310 and the lower open cell 330, and the upper open cell 310, the closed cell 320, and the lower open cell 330 are radially arranged in a row at predetermined intervals, so that a plurality of diffusers a 110 are formed in a circumferential direction of the disk A 100 while being spaced apart from each other at predetermined angles, wherein the diffuser b 210 of the disk B 200 including a plurality of diffuser cells, includes:

a plurality of closed cells radially formed in a row in a direction from the inner circumferential surface 500 to the outer circumferential surface 400 of the disk B 200 at predetermined intervals, in which closed heads 321 of the closed cells are arranged to face the inner circumferential surface 500 so that a plurality of diffusers b 210 of the disk B 200 are formed in a circumferential direction of the disk B 200 while being spaced apart from each other at predetermined angles, and the disk A 100 and the disk B 200 are concentrically coupled to each other such that the diffuser cell of the disk A vertically and partially overlaps the diffuser cell of the disk B 200, in order to form a pressure reduction flow path in a direction from the outer circumferential surface 400 to the inner circumferential surface 500.

Accordingly, the upper open cell 310 of the disk A 100 includes an upper end open head 311 cut with respect to the inner circumferential surface 500, and an open body 312 enlarged and integrally formed with the upper end open head 311, in which the first port 410 is formed to introduce the fluid through a cut portion of the upper end open head 311, the lower open cell 330 of the disk A 100 includes a lower end open head 331 cut with respect to the outer circumferential surface 400, and a lower end open body 332 enlarged and continuously formed with the open head, in which a second port 410 is formed to discharge the fluid through the lower end open head 331 and the lower end open body 332, and the closed head 321 and the closed body 322 of the closed cell provided between the upper open cell 310 and the lower open cell 330 are integrally coupled to each other, thereby forming a flow path.

In such an embodiment, the same effect as described above may be obtained. In general, as described above, inducing the pressure reduction flow in the direction from the inner circumferential surface to the outer circumferential surface may be applied to gas flow. That is, a high-pressure gas is introduced through the inlet of the inner circumferential surface, and is discharged through the outlet while expanding through the pressure reduction flow path. Inducing the pressure reduction flow path in the direction of the outer circumferential surface through the inner circumferential surface is contrary to that described above, and the effect thereof is the same, so that a detailed description thereof will be omitted.

INDUSTRIAL AVAILABILITY

The present invention is mounted in a fluid treatment device such as a valve, and is used to convert a high-pressure fluid into a low-pressure fluid, which is industrially applicable.

The invention claimed is:

1. A fluid pressure reducing device that is mounted in a fluid treatment device including an inlet pipe through which a high-pressure fluid is introduced and an outlet pipe through which a low-pressure fluid is discharged, to induce fluid pressure reduction, the fluid pressure reducing device comprising:

an annular disk A (100) configured to have an outer diameter and an inner diameter; and an annular disk B (200) configured to have an outer diameter and an inner diameter, which are the same as the outer diameter and the inner diameter of the disk A, wherein the disk A (100) and the disk B (200) are coupled to each other as a pair of disks, wherein a plurality of diffuser cells are formed between an outer circumferential surface (400) and an inner circumferential surface (500) of the disk A (100) so that a diffuser a (110) is radially formed in the disk A (100) in a row, a plurality of diffuser cells are formed between an outer circumferential surface (400) and an inner circumferential surface (500) of the disk B (200) so that a diffuser b (210) is radially formed in the disk B (200) in a row, in which the diffusers a (110) and the diffusers b (210) are radially spaced apart from each other at predetermined intervals, wherein each diffuser cell includes a head portion (301) having a trapezoidal shape of a narrow top and a top wide bottom to have a diffusion surface (301c) in a direction in which the fluid moves, and a rectangular body portion (302) coupled adjacent to a lower end of the head portion (301), in which the disk A (100) and the disk B (200) are concentrically coupled to each other such that the body portion (302) of each diffuser cell of the disk A (100) is connected to the head portion (301) of each diffuser cell of the disk B (200), and the body portion (302) of the disk B (100) is connected to and stacked on the head portion (301) of the diffuser cell of the disk A, thereby allowing the diffusers a (110) and the diffusers b (210) to be vertically connected to each other while crossing each other in order to form a pressure reduction flow path, wherein the diffuser a (110) of the disk A (100) including the plurality of diffuser cells includes:

an upper open cell (310) provided adjacent to the outer circumferential surface (400) or the inner circumferential surface (500) of the disk A (100) to form a first port serving as an inlet of the fluid;

a lower open cell (330) provided adjacent to the inner circumferential surface (500) or the outer circumferential surface (400) of the disk A (100) to form a second port serving as an outlet of the fluid; and at least one closed cell (320) provided between the upper open cell (310) and the lower open cell (330), wherein the upper open cell (310), the closed cell (320), and the lower open cell (330) are radially arranged in a row at predetermined intervals, so that a plurality of diffusers a (110) are formed in a circumferential direction of the disk A (100) while being spaced apart from each other at predetermined angles, wherein a plurality of diffusers b (210) of the disk B (200) including the plurality of diffuser cells have a plurality of closed cells (320) radially formed in a row in a direction from the outer circumferential surface (400) to the inner circumferential surface (500) of the disk B (200) at predetermined intervals, in which closed heads (321) of the closed cells are arranged to face the outer circumferential surface (400) so that a plurality of diffusers b (210) of the disk B (200) are formed in a circumferential direction of the disk B (200) while being spaced apart from each other at predetermined angles, and wherein the disk A (100) and the disk B (200) are concentrically coupled to each other such that each diffuser cell of the disk A vertically and partially overlaps each diffuser cell of the disk B (200), in order to form a pressure reduction flow path in a direction from the outer circumferential surface (400) to the inner circumferential surface (500).

2. The fluid pressure reducing device of claim 1, wherein the upper open cell (310) of the disk A (100) includes an upper end open head (311) cut with respect to the outer circumferential surface (400) or the inner circumferential surface (500), and an open body (312) enlarged and integrally formed with the upper end open head (311), in which a first port is formed to introduce the fluid through a cut portion of the upper end open head (311), wherein the lower open cell (330) of the disk A (100) includes a lower end open head (331) cut with respect to the inner circumferential surface (500), and a lower end open body (332) enlarged and continuously formed with the lower end open head (331), in which a second port is formed to discharge the fluid through the lower end open head (331) and the lower end open body (332), and wherein the closed head (321) and the closed body (322) of the closed cell (320) provided between the upper open cell (310) and the lower open cell (330) are integrally coupled to each other, thereby forming a flow path.

3. The fluid pressure reducing device of claim 1, wherein the upper open cell (310) of the disk A (100) includes an upper end open head (311) cut with respect to the inner circumferential surface (500), and an open body (312) enlarged and integrally formed with the upper end open head (311), in which a first port is formed to introduce the fluid through a cut portion of the upper end open head (311), wherein the lower open cell (330) of the disk A (100) includes a lower end open head (331) cut with respect to the outer circumferential surface (400), and a lower end open body (332) enlarged and continuously formed with the lower end open head (331), in which a second port is formed to discharge the fluid through the lower end open head (331) and the lower end open body (332), and wherein the closed head (321) and the closed body (322) of the closed cell (320) provided between the upper open cell (310) and the lower open cell (330) forms a flow path.

\* \* \* \* \*